US008544265B2

(12) United States Patent
Chandler (10) Patent No.: US 8,544,265 B2
(45) Date of Patent: Oct. 1, 2013

(54) HYDRAULIC PRESSURE MULTIPLIER

(75) Inventor: Edward L. Chandler, St. Joseph, MI (US)

(73) Assignee: Ausco Products, Inc., Benton Harbor, MI (US)

( * ) Notice: Subject to any disclaimer, the term of this patent is extended or adjusted under 35 U.S.C. 154(b) by 771 days.

(21) Appl. No.: 12/800,417

(22) Filed: May 14, 2010

(65) Prior Publication Data

US 2010/0300280 A1    Dec. 2, 2010

Related U.S. Application Data

(60) Provisional application No. 61/217,560, filed on Jun. 2, 2009.

(51) Int. Cl.
*B60T 13/58* (2006.01)

(52) U.S. Cl.
USPC .............................. 60/563; 60/574

(58) Field of Classification Search
USPC ............. 91/420, 421, 433, 432, 422; 60/560, 60/563, 574–579
See application file for complete search history.

(56) References Cited

U.S. PATENT DOCUMENTS

| | | | | |
|---|---|---|---|---|
| 3,407,601 A | * | 10/1968 | Beck | 60/537 |
| 3,466,870 A | * | 9/1969 | Hackett | 60/563 |
| 3,832,851 A | * | 9/1974 | Kiernan | 60/563 |
| 6,993,907 B2 | * | 2/2006 | Cooney | 60/563 |

OTHER PUBLICATIONS

Drawing No. 36991 of Auto Specialties Mfg. Co., St. Joseph, MI (Nov. 30, 1983).
Brochure of Knott GmbH, Eggstatt, Germany (undated but prior to the invention of the Applicants).

\* cited by examiner

*Primary Examiner* — Edward Look
*Assistant Examiner* — Logan Kraft
(74) *Attorney, Agent, or Firm* — Renner, Kenner, Greive, Bobak, Taylor & Weber (57) ABSTRACT

A hydraulic pressure multiplier having a housing, a bore in the housing and an outer piston slidably positioned within the bore. The pressure multiplier also includes an inner piston having a bore therethrough, the inner piston being positioned within a bore within the outer piston. An opening is provided through an end wall of the outer piston, and a mechanism is provided to selectively control hydraulic fluid flow into the bore within the outer piston. Hydraulic fluid first flows through the opening in the outer piston and through the bore through the inner piston to actuate a slave cylinder or a hydraulic piston within a brake. After a threshold pressure is reached within the slave cylinder, the valve closes and the outer piston is caused to move axially, thereby providing an increased hydraulic pressure within the slave cylinder.

17 Claims, 9 Drawing Sheets

HYDRAULIC PRESSURE MULTIPLIER

This application claims priority from U.S. provisional patent application Ser. No. 61/217,560 filed on Jun. 2, 2009, which is incorporated herein by reference in its entirety.

TECHNICAL FIELD

This invention relates to a hydraulic pressure multiplier particularly useful in braking systems. More specifically, this invention relates to such a hydraulic pressure multiplier adapted to be installed inline between a master cylinder and a slave cylinder, the pressure multiplier including two concentric pistons.

BACKGROUND ART

Off-highway braking systems often utilize a master cylinder to provide a hydraulic actuating mechanism. The master cylinder, when actuated, supplies high pressure fluid to a slave cylinder, which actuates the braking mechanism. Frequently, however, a master cylinder alone cannot meet the force and volume requirements of hydraulically actuated off-highway braking systems. Such systems require both a large volume of fluid as well as high pressure fluid in order to effectively actuate the brake and cause sufficient braking force. When a master cylinder is adapted to provide the necessary volume to actuate the brake, then the pressure of the fluid is decreased. Conversely, when the master cylinder is adapted to provide high-pressure fluid, then it is usually incapable of providing the high volume of fluid necessary to generate sufficient braking force.

One method used in the off-highway braking system industry to overcome the deficiencies of a master cylinder, as described above, is to add a power booster to the master cylinder. Hydraulic power boosters are well known in the art and are commercially available from several manufacturers, but they are also relatively expensive. An alternative solution involves replacing the master cylinder with a power brake valve that utilizes the high pressure hydraulic system of the vehicle on which the brake is installed. This solution is both expensive and complicated, and is therefore not ideal.

Thus, the need exists for a hydraulic pressure multiplier capable of both providing the volume of fluid required to actuate the brake while also providing the high pressure needed to generate the stopping forces required by off-highway vehicles.

DISCLOSURE OF THE INVENTION

It is thus an object of one aspect of the present invention to provide a hydraulic pressure multiplier that is simple and economical.

It is an object of another aspect of the present invention to provide a hydraulic pressure multiplier, as above, that provides an increase in fluid pressure without requiring a substantial increase in fluid volume.

These and other objects of the present invention, as well as the advantages thereof over existing prior art forms, which will become apparent from the description to follow, are accomplished by the improvements hereinafter described and claimed.

In general, a hydraulic pressure multiplier according to the concepts of the invention includes a housing defining an inner cavity. An outer piston is movably positioned within the inner cavity and includes a sidewall and an end wall that together define an inner recess having an open end. A stationary inner piston is received in the open end of the inner recess in the outer piston, and a bore is provided through the inner piston. An opening through the outer piston is in fluid communication with the inner cavity and the inner recess to allow fluid flow therebetween. A biasing mechanism applies a biasing force to the outer piston, and a valve mechanism is movable between an open position and a closed position. The valve mechanism prevents fluid flow through the opening in the outer piston when it is in the closed position.

In accordance with another aspect of the present invention, a hydraulic pressure multiplier includes a housing defining an inner cavity, an inlet port in fluid communication with the inner cavity: an outlet port; an outer piston slidably positioned within the inner cavity and including a sidewall and an end wall; an inner recess defined by the sidewall and the end wall of the outer piston, the inner recess having an open end; a gasket positioned around the outer piston and within the inner cavity; a stationary inner piston positioned at least partially within the inner recess in the outer piston; an inner bore extending through the inner piston and in fluid communication with the inner recess and the outlet port; a gasket positioned around the inner piston and within the inner recess of the outer piston; a biasing mechanism that biases the outer piston toward the inlet port; an opening through the outer piston; and a valve mechanism that selectively prevents fluid flow through the opening.

Preferred exemplary hydraulic pressure multipliers according to the concepts of the present invention are shown by way of example in the accompanying drawings without attempting to show all the various forms and modifications in which the invention might be embodied, the invention being measured by the appended claims and not by the details of the specification.

PREFERRED EMBODIMENTS FOR CARRYING OUT THE INVENTION

Figure 1:
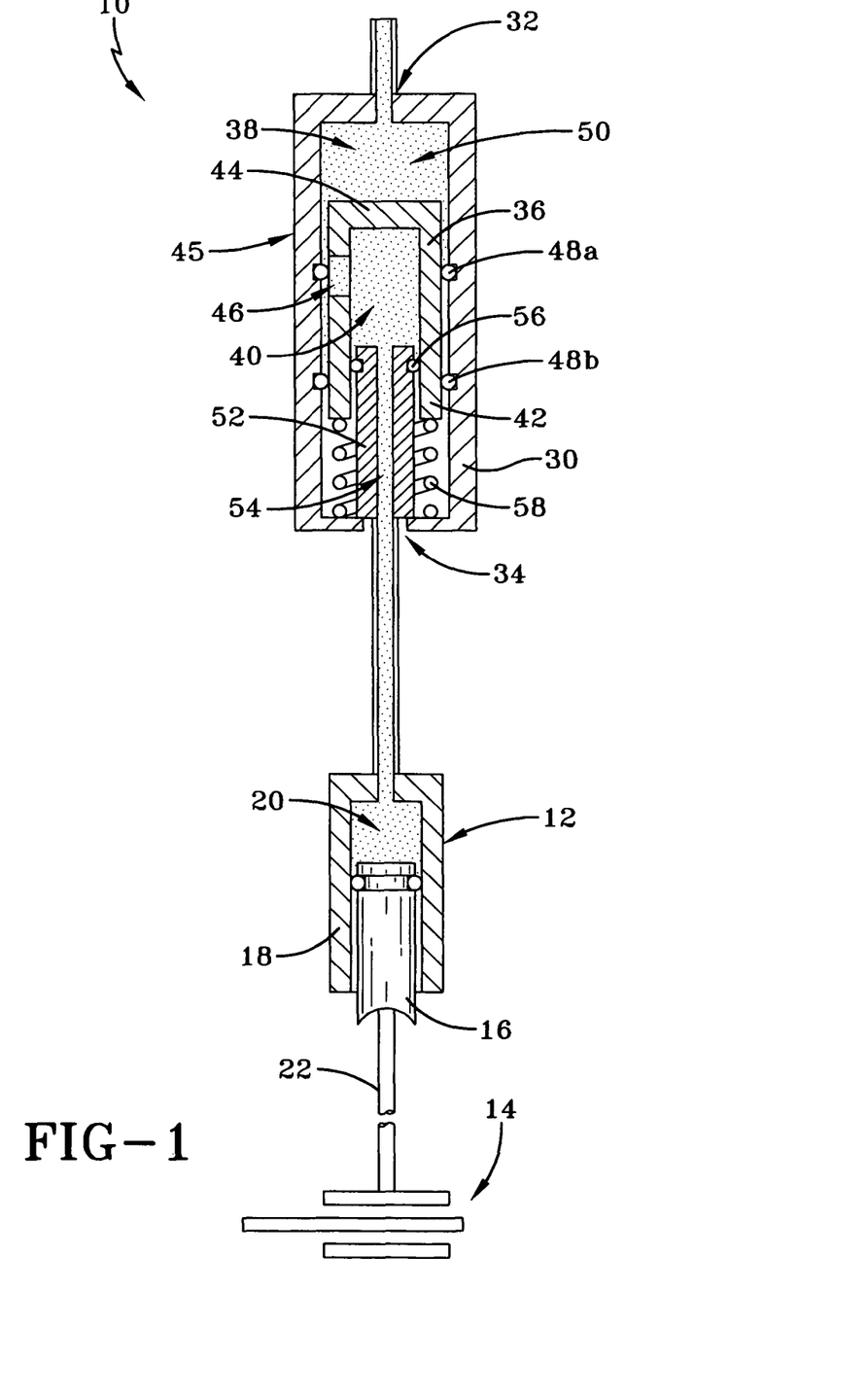
FIG. 1 a sectional view of one embodiment of a hydraulic pressure multiplier according to the concepts of the present invention.
Figure 2:
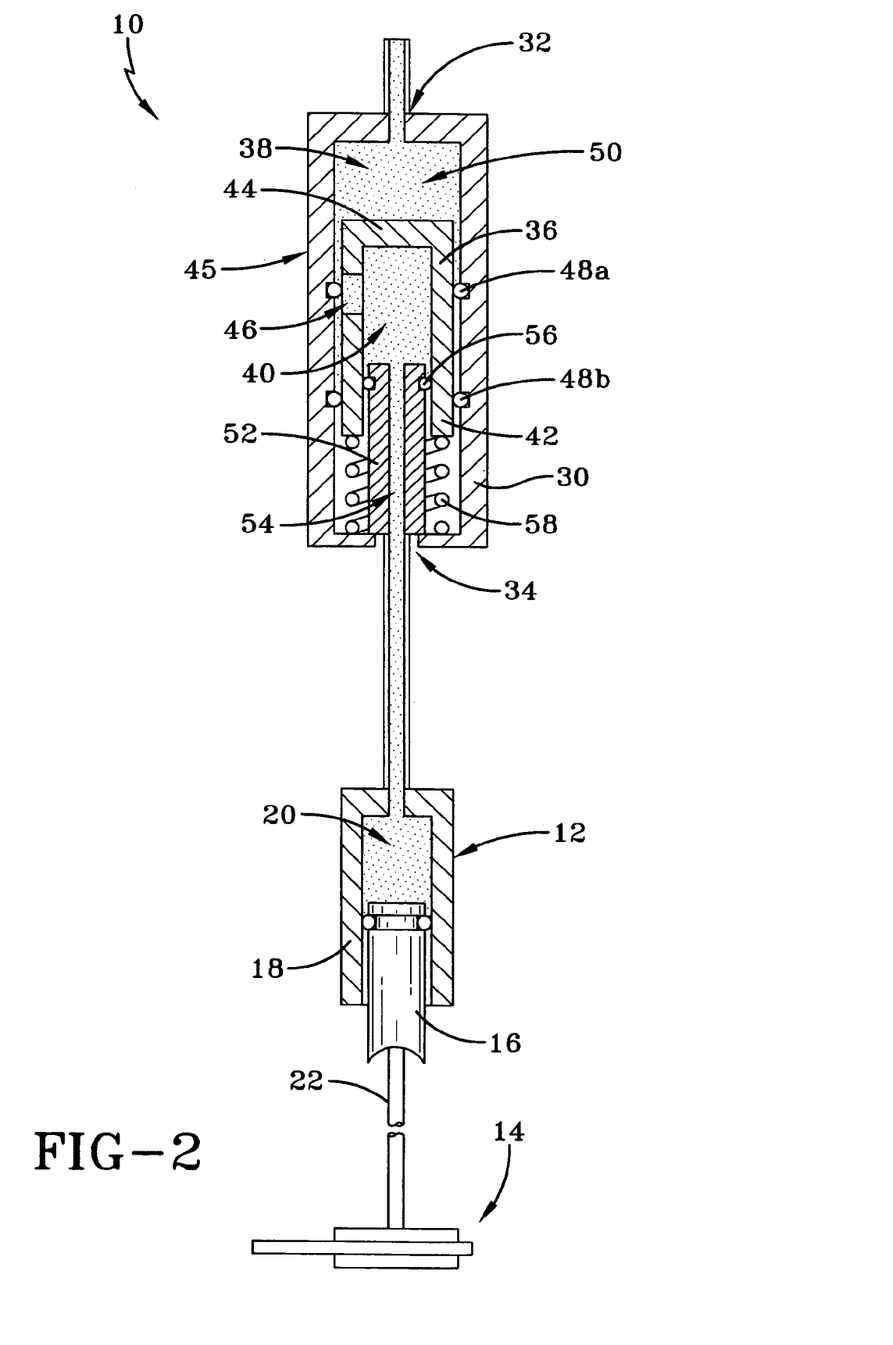
FIG. 2 is a sectional view like FIG. 1 but showing the hydraulic pressure multiplier in a partially actuated state.
Figure 3:
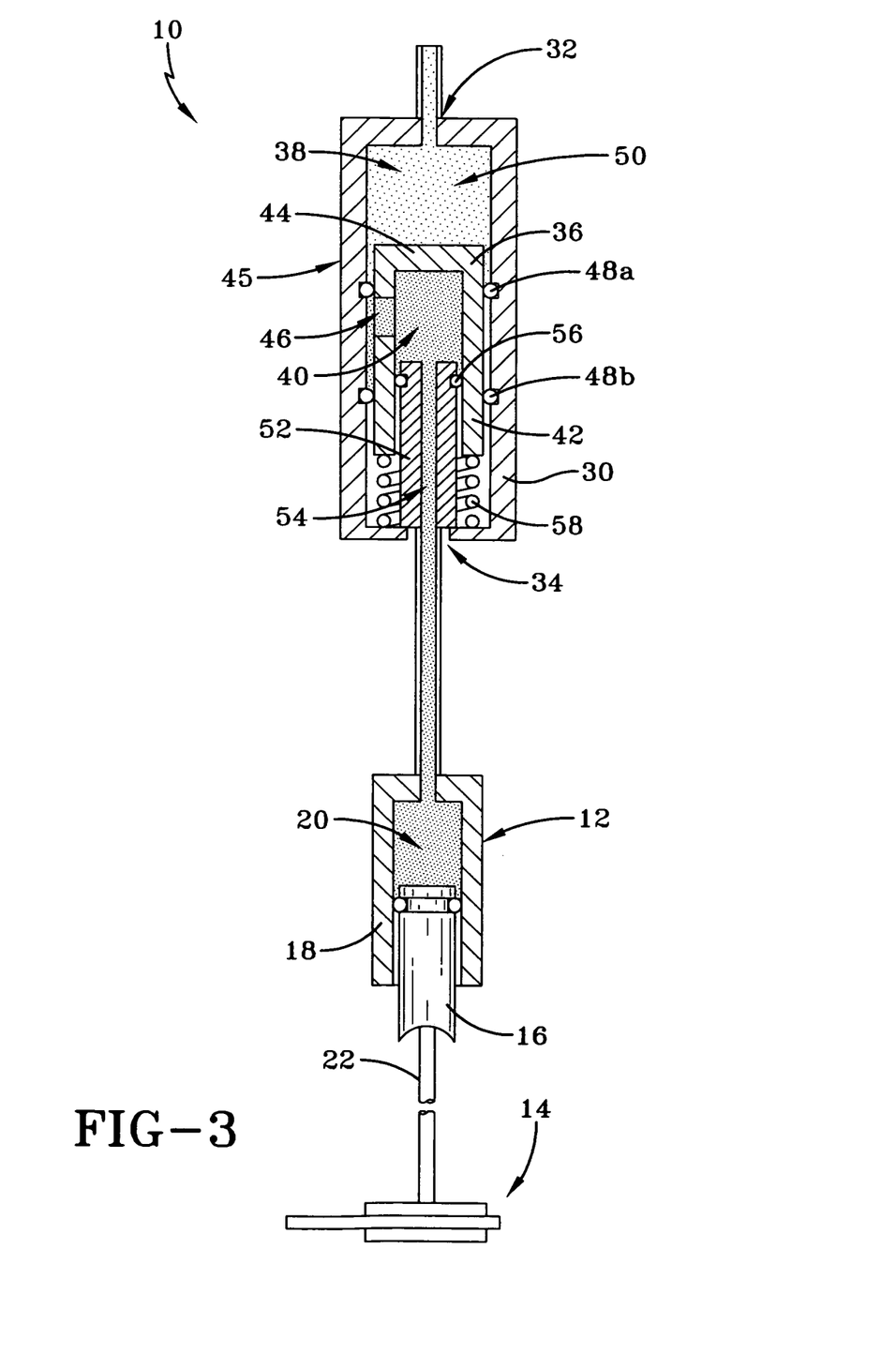
FIG. 3 is a sectional view like FIG. 1 but showing the hydraulic pressure multiplier in a fully actuated state.

One embodiment of a hydraulic pressure multiplier made in accordance with the present invention is shown in FIGS. 1-3 and is indicated generally by the numeral 10. Pressure multiplier 10 may be installed and positioned inline between a master cylinder (not shown) and a slave cylinder 12 or other hydraulic piston in a brake assembly.

Slave cylinder 12 is adapted to actuate a braking assembly schematically indicated by the numeral 14. It is also contemplated, however, that pressure multiplier 10 may be incorporated into the master cylinder housing or into the brake body. Slave cylinder 12 may be any slave cylinder known to those skilled in the art, and includes a piston 16 slidably received in a bore in body 18, and a fluid chamber 20. A piston rod 22 extends from slave cylinder piston 16 to engage or otherwise actuate brake assembly 14.

Brake assembly 14 may be any brake assembly known to those skilled in the art and adapted to be actuated by a slave cylinder. It is also contemplated, as mentioned above, that pressure multiplier 10 may be positioned between a master cylinder and a hydraulic piston provided within a brake assembly, thus making a slave cylinder unnecessary. In such an assembly, pressure multiplier 10 remains substantially the same, but communicates with the piston within the brake rather than with a slave cylinder.

Pressure multiplier 10 includes a housing 30 having a fluid inlet opening or port 32 and a fluid outlet opening or port 34. Fluid inlet opening 32 is in fluid communication with the master cylinder, and fluid outlet opening 34 is in fluid communication with slave cylinder 12. Pressure multiplier housing 30 is generally cylindrical in shape, although it should be appreciated that housing 30 may take on other shapes. An outer piston 36 is slidably positioned within a inner cavity 38 in housing 30. Outer piston 36 is generally cylindrical in shape, and includes an inner recess 40 defined by an annular side wall 42 and an end wall 44. The outer diameter of outer piston 36 is less than the diameter of inner cavity 38 in housing 30, thereby creating a space between outer piston 36 and the wall of inner cavity 38. A valve mechanism 45 controls the flow of fluid into said inner recess 40. Valve mechanism 45 includes a port 46 in annular side wall 42 of outer piston 36, and an annular seal 48a, also referred to as a gasket 48a, around outer piston 36 adjacent to port 46 and within inner cavity 38. A second annular seal 48b is provided nearer to the open end of inner recess 40 to prevent fluid leakage. A fluid chamber 50 is defined by inner cavity 38 and end wall 44 of outer piston 36, and is sealed by annular seals 48a and 48b. Pressure multiplier fluid inlet opening 32 opens into fluid chamber 50.

An inner piston 52 is positioned concentrically within housing 30 and within inner recess 40 of outer piston 36 adjacent to outlet 34. Inner piston 52 is stationary and includes a bore 54 therethrough. Bore 54 is in fluid communication with inner recess 40 in outer piston 36 and with pressure multiplier outlet 34. While inner piston 52 is shown in FIGS. 1-3 as being positioned adjacent to an end wall of housing 30, an end plate (FIGS. 7-9) may alternatively be provided to secure inner piston 52 within housing 30. An annular seal 56 is provided around inner piston 52 and within inner recess 40 of outer piston 36. A biasing mechanism 58 is provided around inner piston 52 and is adapted to bias outer piston 36 in an unactuated state. Biasing mechanism 58 may be a compression spring, or any other known biasing mechanism suitable for the intended purpose.

Hydraulic pressure multiplier 10 is shown in FIG. 1 in the unactuated state, in which port 46 is open and in fluid communication with fluid chamber 50 due to the position of annular seal 48a. When hydraulic pressure multiplier 10 is in an unactuated state, biasing mechanism 58 is substantially uncompressed. When the master cylinder is actuated, pressurized hydraulic fluid is forced into fluid chamber 50 through pressure multiplier fluid inlet opening 32. The pressurized hydraulic fluid passes through port 46 and into inner recess 40 within outer piston 36. The pressurized hydraulic fluid then flows through bore 54 in inner piston 52 and exits pressure multiplier 10 at fluid outlet opening 34. Piston 16 in slave cylinder 12 is caused to move axially within body 18, thereby actuating brake assembly 14 and taking up any running clearances therein, as shown in FIG. 2.

When a predetermined pressure has been reached within fluid chamber 50, outer piston 36 is caused to move axially within inner cavity 38, thereby compressing biasing mechanism 58. The pressure threshold at which outer piston 36 begins to move is determined by the force exerted on outer piston 36 by biasing mechanism 58. As the pressure of the fluid and the resistance of brake assembly 14 increases, the pressure within fluid chamber 50 will, at the pressure threshold, surpass the resistance provided by biasing mechanism 58. When outer piston 36 moves axially port 46 also moves axially past annular seal 48a to prevent additional fluid flow into or out of inner recess 40 in outer piston 36.

Additional hydraulic fluid flowing into fluid chamber 50 increases the pressure acting on end wall 44 of piston 36 to create a relatively large force on the piston. The force acting on piston 36 is transferred to fluid within inner recess 40 and bore 54, both having a reduced diameter as compared to fluid chamber 50, thereby providing a further increase in pressure of the hydraulic fluid within fluid chamber 20 of slave cylinder 12, as shown in FIG. 3. Thus, a relatively small volume of hydraulic fluid introduced in fluid chamber 50 creates a relatively high amount of pressure within slave cylinder 12.

Figure 4:
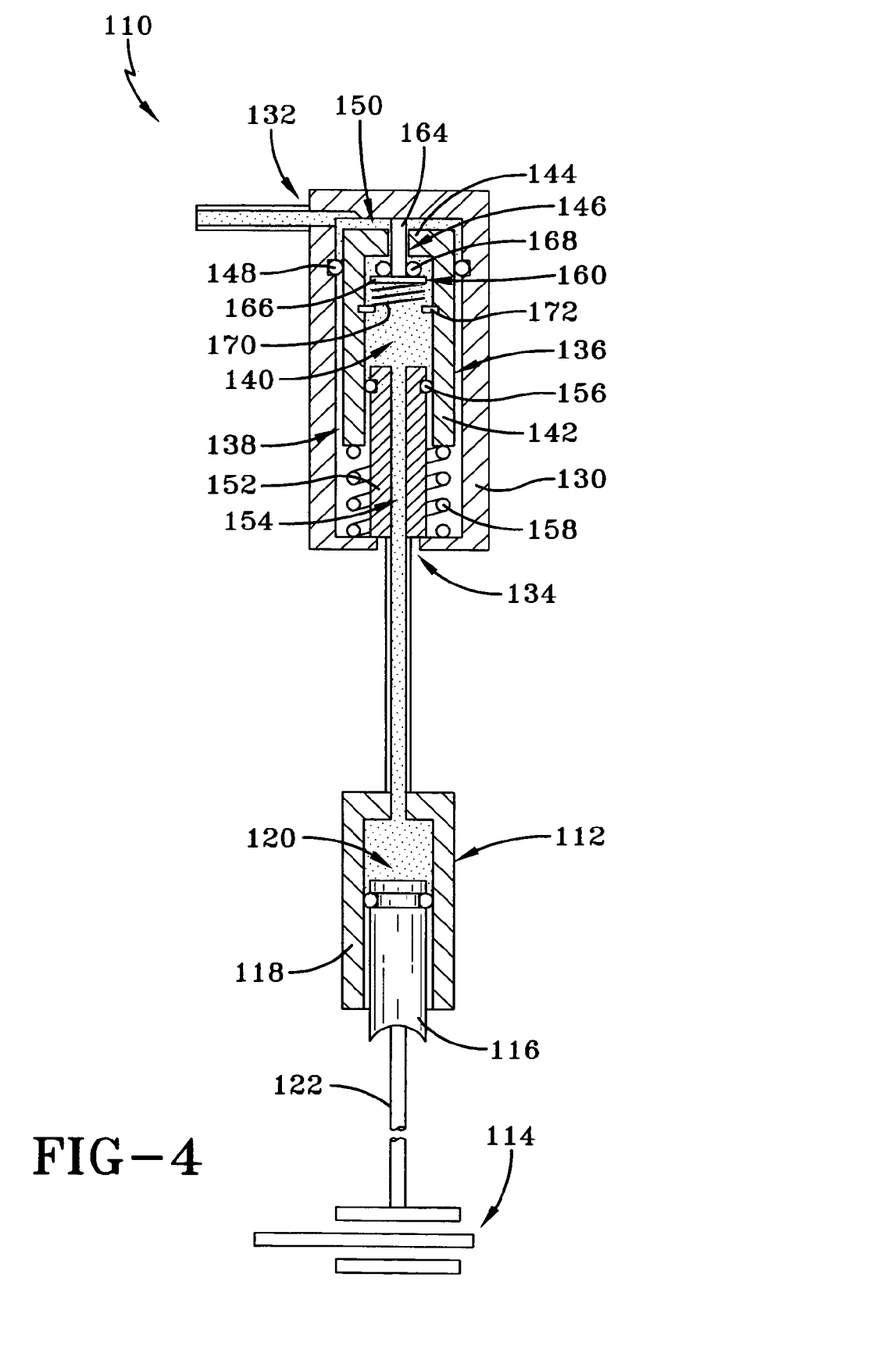
FIG. 4 is a sectional view of another embodiment of a hydraulic pressure multiplier according to the concepts of the present invention.
Figure 5:
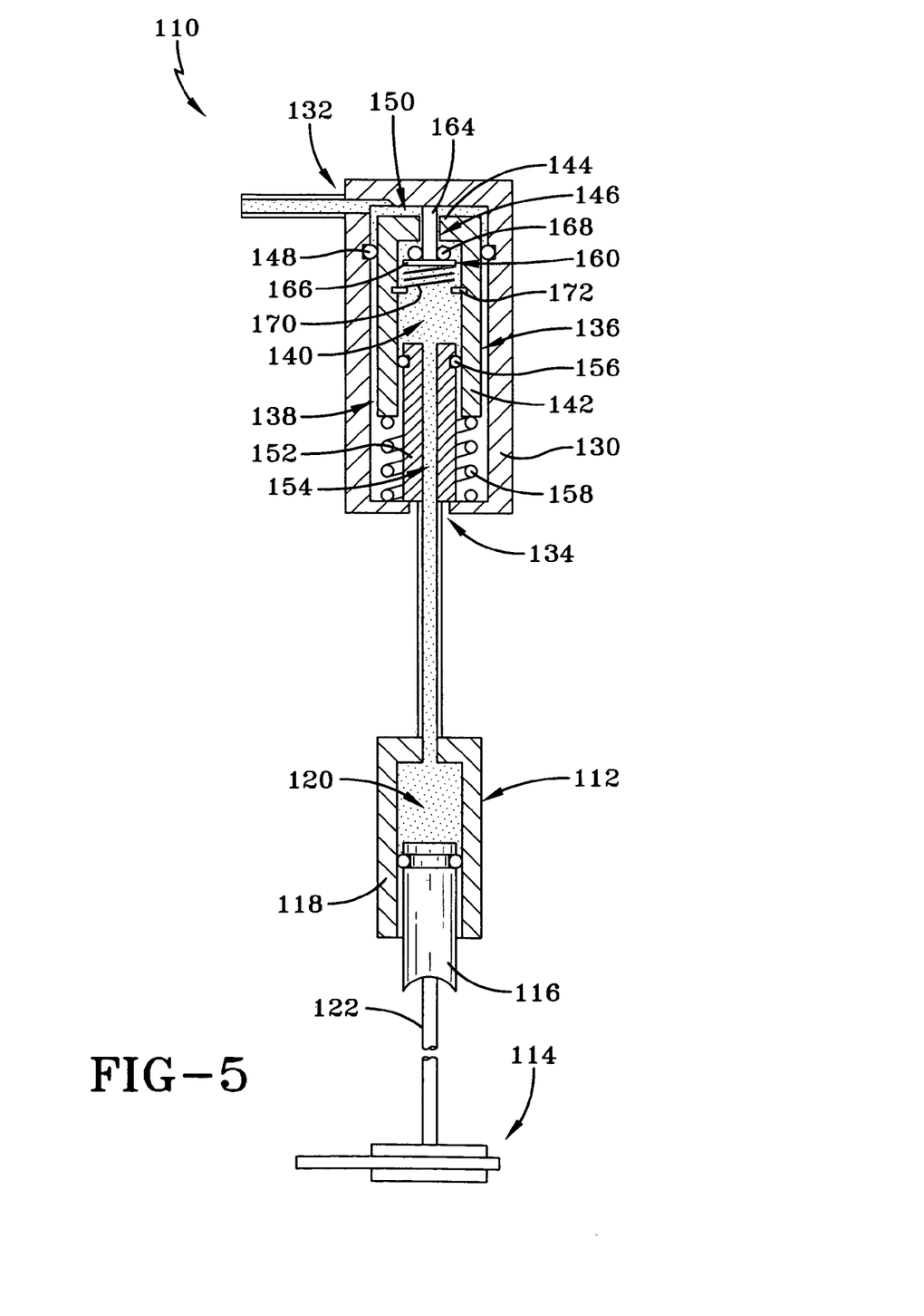
FIG. 5 is a sectional view like FIG. 4 but showing the hydraulic pressure multiplier in a partially actuated state.
Figure 6:
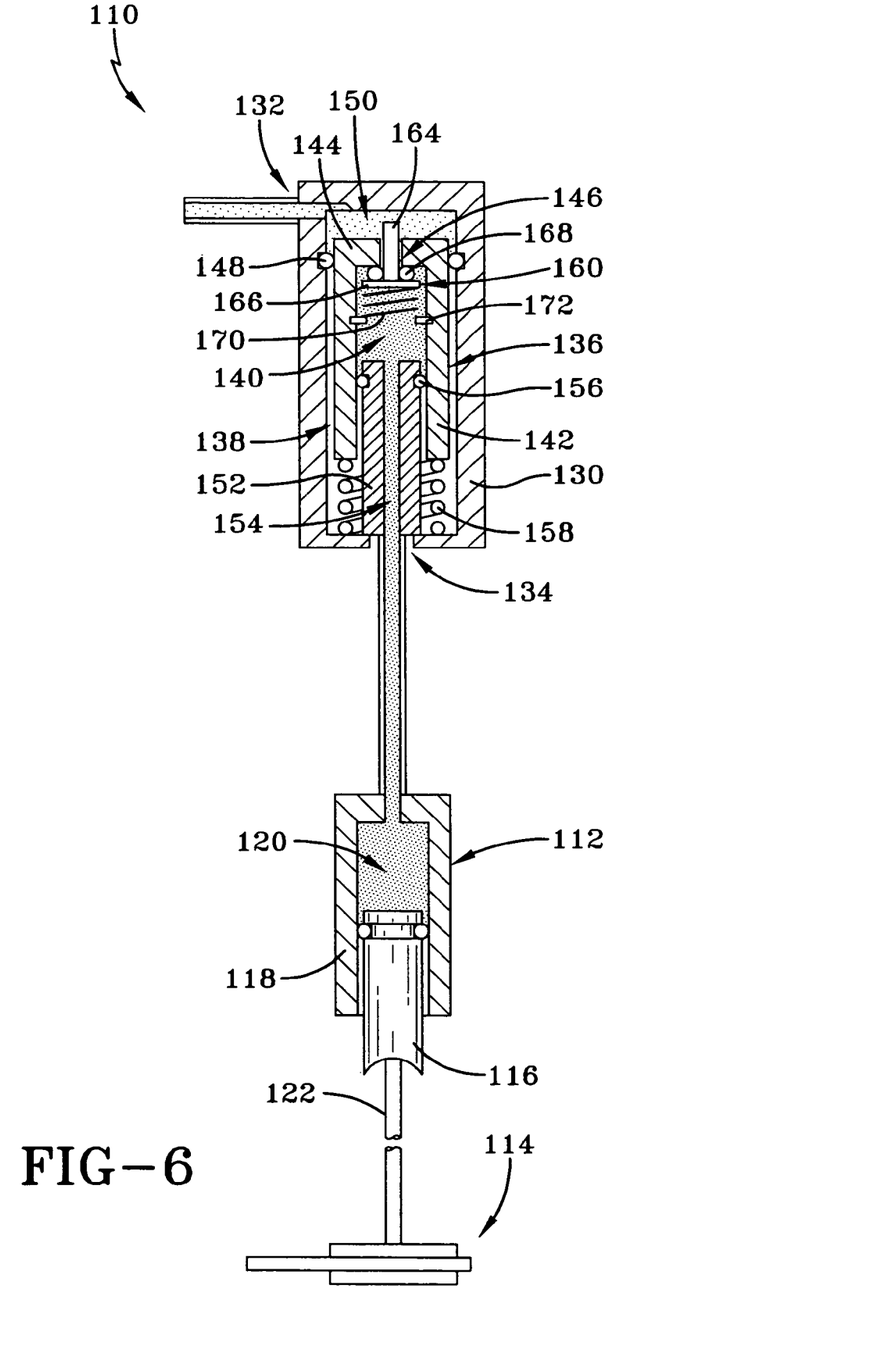
FIG. 6 is a sectional view like FIG. 4 but showing the hydraulic pressure multiplier in a fully actuated state.

Another embodiment of the hydraulic pressure multiplier is shown in FIGS. 4-6 and is indicated generally by the numeral 110. Pressure multiplier 110 is identical to pressure multiplier 10 discussed above and shown in FIGS. 1-3 in all respects except for the differences discussed below. Thus, like components are numbered with like numerals.

Pressure multiplier 110 may be installed and positioned inline between a master cylinder (not shown) and a slave cylinder 112. Slave cylinder 112 is adapted to actuate a braking assembly 114. Slave cylinder 112 includes a piston 116 slidably received in a bore in body 118, and a fluid chamber 120. A piston rod 122 extends from slave cylinder piston 116 to engage or otherwise actuate brake assembly 114. Brake assembly 114 may be any brake known to those skilled in the art and adapted to be actuated by a slave cylinder.

Pressure multiplier 110 includes a housing 130 having a fluid inlet opening or port 132 and a fluid outlet opening or port 134. Fluid inlet opening 132 is in fluid communication with the master cylinder, and fluid outlet opening 134 is in fluid communication with slave cylinder 112. Pressure multiplier housing 130 is generally cylindrical in shape, although it should be appreciated that housing 130 may take on other shapes. An outer piston 136 is slidably positioned within an inner cavity 138 in housing 130. Outer piston 136 is generally cylindrical in shape, and includes an inner recess 140 therein defined by an annular side wall 142 and an end wall 144 of outer piston 136. The diameter of outer piston 136 is less than the diameter of inner cavity 138 in housing 130, thereby creating a space between outer piston 136 and the wall of inner cavity 138. A port or opening 146 is provided in end wall 144 of outer piston 136, and at least one annular seal 148 is provided around outer piston 136 and within inner cavity 138. A fluid chamber 150 is defined by inner cavity 138 in housing 130 and end wall 144 of outer piston 136, and is sealed by annular seal 148. Pressure multiplier inlet 132 opens into fluid chamber 150.

An inner piston 152 is positioned concentrically within housing 130 and within inner recess 140 of outer piston 136 adjacent to outlet 134. Inner piston 152 is stationary and includes a bore 154 therethrough. Bore 154 is in fluid communication with inner recess 140 in outer piston 136 and with pressure multiplier outlet 134. An annular seal 156 is provided around inner piston 152 and within inner recess 140 of outer piston 136. While inner piston 152 is shown in FIGS. 4-6 as being positioned adjacent to an end wall of housing 130, an end plate (FIGS. 7-9) may alternatively be provided to secure inner piston 152 within housing 130. A biasing mechanism 158 is positioned around inner piston 152 and is adapted to bias outer piston 136 in an unactuated state as shown in FIG. 4. Biasing mechanism 158 may be any known biasing mechanism suitable for the intended use, such as, for example, a compression spring.

A valve mechanism 160 is provided within opening 146 to selectively allow hydraulic fluid to fill inner recess 140 within outer piston 136. The valve mechanism depicted in FIGS. 4-6 includes a plug 162 having a stem 164 and an annular flange 166 extending from stem 164. Stem 164 is received through opening 146 in end wall 144, and annular flange 166 engages the interior of end wall 144 of outer piston 136 to prevent plug 162 from being removed therefrom. Stem 164 has a diameter that is less than the diameter of opening 146 so that its position within opening 146 does not prevent the flow of fluid therethrough. An annular seal 168 is provided around stem 164 of plug 162 adjacent to flange 166 to create a seal between plug 162 and end wall 144 of outer piston 136.

A compression spring 170 is provided within inner recess 140 to bias the valve mechanism 160 in a closed position in which annular seal 168 contacts end wall 144. Compression spring 170 is positioned between plug 162 and a retaining ring 172 secured to outer piston 136 within inner recess 140, and provides a lesser biasing force as compared to compression spring 158. Stem 164 of plug 162 has a length such that it extends through opening 146 in end wall 144 and engages housing 130 to maintain a clearance between annular seal 168 and end wall 144 when outer piston 136 is in an unactuated position.

Hydraulic pressure multiplier 110 is shown in FIG. 4 in an unactuated state, with valve mechanism 160 open, thereby allowing hydraulic fluid to flow into fluid chamber 150 from inlet 132 through opening 146, around plug 162 and into inner recess 140 in outer piston 136. Biasing mechanism 158 is in a substantially uncompressed state in the unactuated position. When the master cylinder is actuated, pressurized hydraulic fluid is forced into fluid chamber 150 through pressure multiplier fluid inlet opening 132. The pressurized hydraulic fluid passes through opening 146 and into inner recess 140 within outer piston 136 due to the open position of valve mechanism 160.

The pressurized hydraulic fluid then flows through bore 154 in inner piston 152 and exits pressure multiplier 110 at fluid outlet opening 134. Piston 116 in slave cylinder 112 is caused to move axially within body 118 by the pressurized fluid, thereby actuating brake assembly 114 and taking up any running clearances therein, as shown in FIG. 5.

When a predetermined pressure has been reached within fluid chamber 150, outer piston 136 is caused to move axially within inner cavity 138, thereby compressing biasing mechanism 158. The pressure threshold at which outer piston 136 begins to move is determined by the force exerted on outer piston 136 by biasing mechanism 158. As the pressure of the fluid and the resistance of brake assembly 114 increases, the pressure within fluid chamber 150 will, at the pressure threshold, surpass the resistance provided by biasing mechanism 158. When outer piston 136 is caused to move, plug 162 and annular seal 168 move axially toward end wall 144 due to compression spring 170 acting thereon, thereby preventing additional fluid flow into or out of inner recess 140 in outer piston 136.

Additional hydraulic fluid flowing into fluid chamber 150 increases the pressure acting on end wall 144 of piston 136 to create a relatively large force on the piston. The force acting on piston 136 is transferred to fluid within inner recess 140 and bore 154, both having a reduced diameter as compared to fluid chamber 150, thereby providing a further increase in pressure of the hydraulic fluid within fluid chamber 120 of slave cylinder 112, as shown in FIG. 6. Thus, a relatively small volume of hydraulic fluid creates a relatively high amount of pressure within slave cylinder 12.

Figure 7:
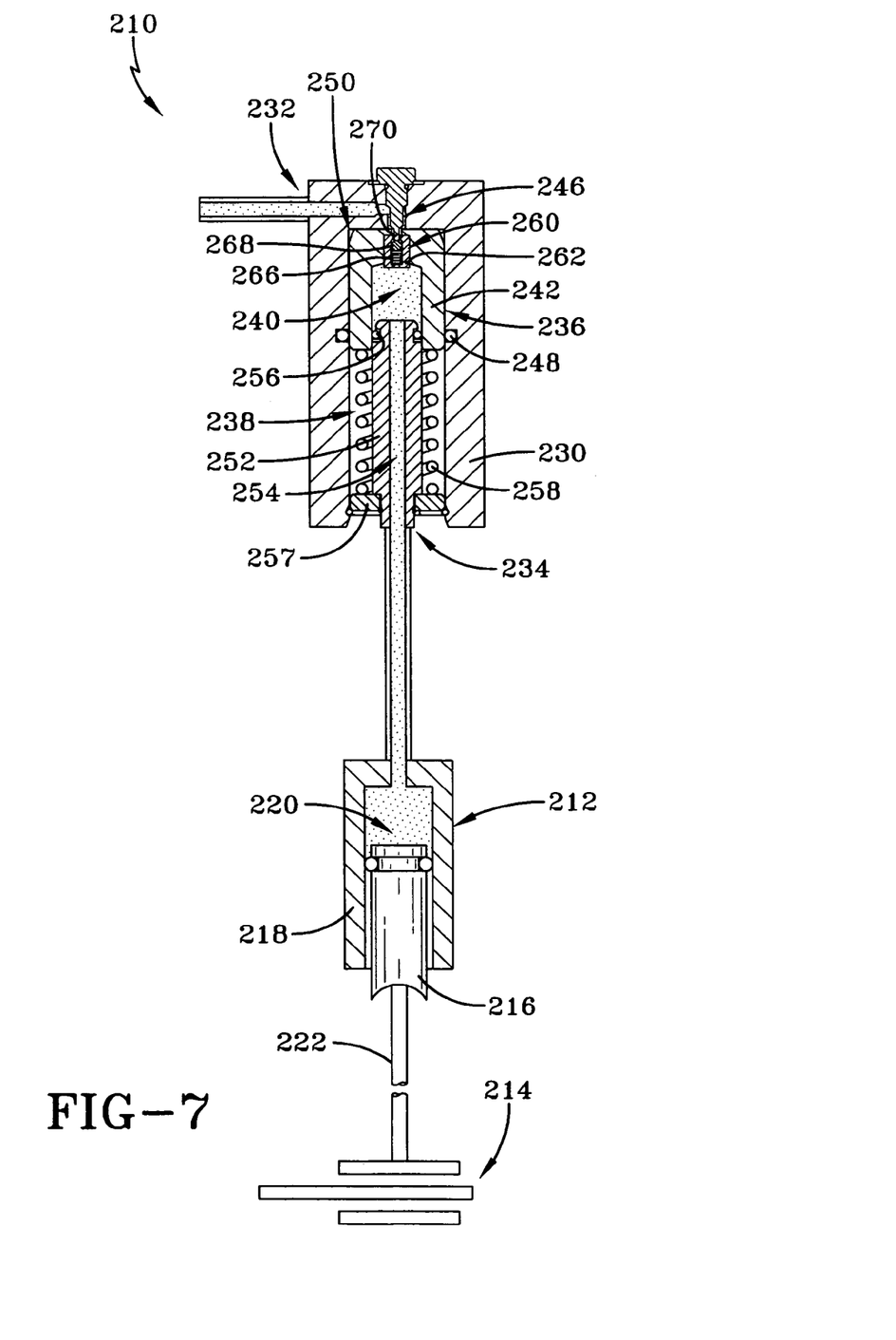
FIG. 7 is a sectional view of another embodiment of a hydraulic pressure multiplier according to the concepts of the present invention.
Figure 8:
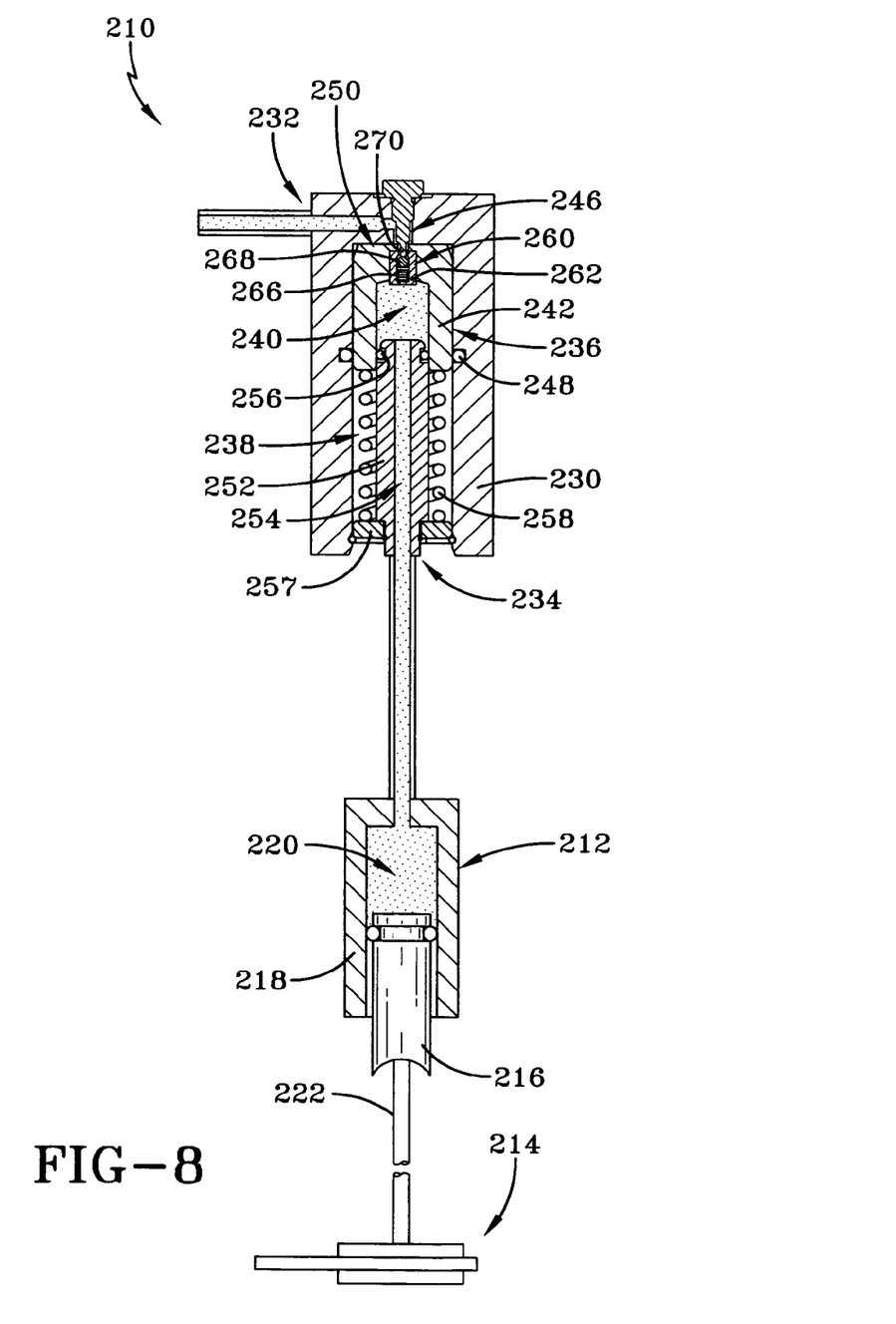
FIG. 8 is a sectional view like FIG. 7 but showing the hydraulic pressure multiplier in a partially actuated state.
Figure 9:
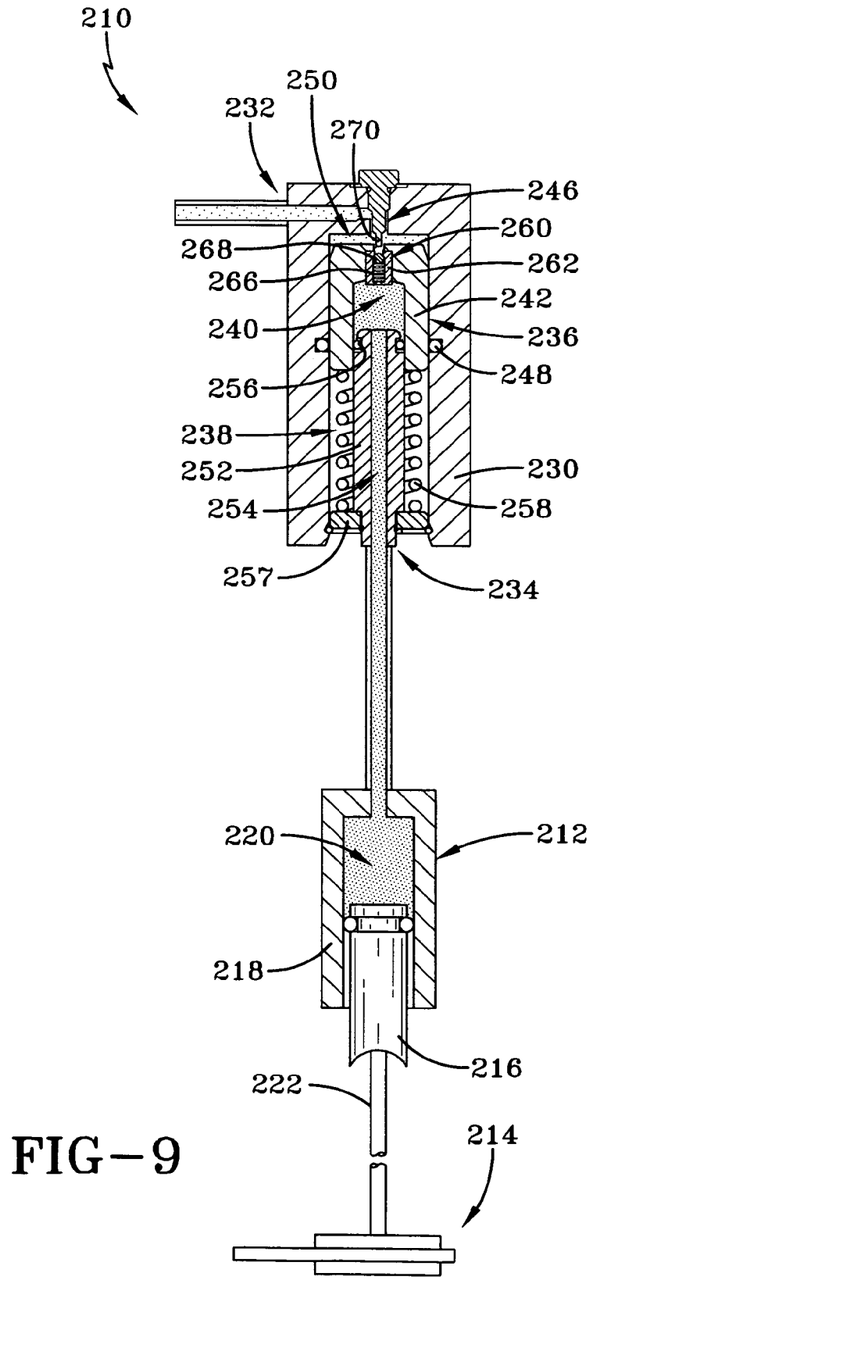
FIG. 9 is a sectional view like FIG. 7 but showing the hydraulic pressure multiplier in a fully actuated state.

An additional embodiment of the hydraulic pressure multiplier is shown in FIGS. 7-9 and is indicated generally by the numeral 210. Pressure multiplier 210 is identical to pressure multipliers 10 and 110 discussed above and shown in FIGS. 1-6 in all respects except for the differences discussed below. Thus, like components are numbered with like numerals.

Pressure multiplier 210 may be installed and positioned inline between a master cylinder (not shown) and a slave cylinder 212, or a hydraulic piston within a brake assembly. Slave cylinder 212 is adapted to actuate a braking assembly 214. Slave cylinder 212 includes a piston 216 slidably received in a bore in body 218, and a fluid chamber 220. A piston rod 222 extends from slave cylinder piston 216 to engage or otherwise actuate brake assembly 214. Brake assembly 214 may be any brake known to those skilled in the art and adapted to be actuated by a slave cylinder.

Pressure multiplier 210 includes a housing 230 having a fluid inlet opening or port 232 and a fluid outlet opening or port 234. Fluid inlet opening 232 is in fluid communication with the master cylinder, and fluid outlet opening 234 is in fluid communication with slave cylinder 212. Pressure multiplier housing 230 is generally cylindrical in shape, although it should be appreciated that housing 230 may take on other shapes. An outer piston 236 is slidably positioned within an inner cavity 238 in housing 230. Outer piston 236 is generally cylindrical in shape, and includes a inner recess 240, which is open at one end and terminates at the other end at valve wall 244 defined by a flange 245. The diameter of outer piston 236 is less than the diameter of inner cavity 238 in housing 230, thereby creating a space between outer piston 236 and the wall of inner cavity 238. A port, or opening 246 is provided in valve wall 244 of outer piston 236, and at least one annular seal 248 is provided around outer piston 236 and within inner cavity 238. A fluid chamber 250 is defined by inner cavity 238 in housing 230 and valve wall 244 of outer piston 236, and is sealed by annular seal 248. Pressure multiplier inlet 232 opens into and is in fluid communication with fluid chamber 250.

An inner piston 252 is positioned concentrically within housing 230 and within inner recess 240 of outer piston 236 adjacent to outlet 234. Inner piston 252 is stationary and includes a bore 254 therethrough. Bore 254 is in fluid communication with inner recess 240 in outer piston 236 and pressure multiplier outlet 234. An annular seal 256 is provided around inner piston 252 and within inner recess 240 of outer piston 236. An end plate 257 may optionally be provided in inner cavity 238 to retain inner piston 252 therein. A biasing mechanism 258 is positioned around inner piston 252 and is adapted to bias outer piston 236 in an unactuated state. Biasing mechanism 58 may be a compression spring, or any other known biasing mechanism suitable for the intended purpose.

A valve mechanism 260 is provided within opening 246 of outer piston 236 to selectively allow hydraulic fluid to fill inner recess 240 within outer piston 236, and is secured therein in one axial direction by a flange 262. The valve mechanism depicted in FIGS. 7-9 includes a ball valve having a cage (not shown) secured within opening 246 to prevent axial movement of the valve components, a compression spring 266 secured at one end within the cage, and a ball 268 positioned at the other end of compression spring 266 adjacent to fluid chamber 250. A plug 270 extends from housing 230 into opening 246 and is in contact with ball 268 when pressure multiplier 210 is in an unactuated position. Plug 270 has a diameter that is less than the diameter of opening 246 so that it does not prevent fluid from flowing through opening 246.

Hydraulic pressure multiplier 210 is shown in FIG. 7 in an unactuated state, the biasing mechanism 258 being in a substantially uncompressed state. When the master cylinder is actuated, pressurized hydraulic fluid is forced into fluid chamber 250 through pressure multiplier fluid inlet opening 232. The pressurized hydraulic fluid passes through opening 246 and into inner recess 240 within outer piston 236 due to the open position of valve mechanism 260. The pressurized hydraulic fluid then flows through bore 254 in inner piston 252 and exits pressure multiplier 210 at fluid outlet opening 234. Piston 216 in slave cylinder 212 is caused to move axially within body 218 by the pressurized fluid, thereby actuating brake assembly 214 and taking up any running clearances therein, as shown in FIG. 8.

When a predetermined pressure has been reached within fluid chamber 250, outer piston 236 is caused to move axially within inner cavity 238, thereby compressing biasing mechanism 258. The pressure threshold at which outer piston 236 begins to move is determined by the force exerted on outer piston 236 by biasing mechanism 258. As the pressure of the fluid and the resistance of brake assembly 214 increases, the pressure within fluid chamber 250 will, at the pressure threshold, surpass the resistance provided by biasing mechanism 258. When outer piston 236 is caused to move, ball 268 moves axially toward valve wall 244 due to compression spring 262 acting thereon, thereby preventing additional fluid flow into or out of inner recess 240 in outer piston 236.

Additional hydraulic fluid flowing into fluid chamber 250 increases the pressure acting on end wall 144 of piston 136 to create a relatively large force on the piston. The force acting on piston 136 is transferred to fluid within inner recess 140 and bore 154, both having a reduced diameter as compared to fluid chamber 250, thereby providing a further increase in pressure of the hydraulic fluid within fluid chamber 220 of slave cylinder 212, as shown in FIG. 9. Thus, a relatively small volume of hydraulic fluid creates a relatively high amount of pressure within slave cylinder 212.

It is thus evident that a hydraulic pressure multiplier constructed as described herein accomplishes the objects of the present invention and otherwise substantially improves the art.

What is claimed is:

1. A hydraulic pressure multiplier comprising a housing defining a cavity, an outer piston movably positioned within said cavity and including a sidewall and an end wall that together define an inner recess having an open end, a stationary inner piston received in said open end of said inner recess in said outer piston, a bore through said inner piston, an opening through said end wall of said outer piston providing fluid communication between said cavity and said inner recess, a biasing mechanism applying a biasing force to said outer piston, and a mechanism to close the fluid communication between said cavity and said inner recess when said biasing force is overcome by pressure within said cavity, said mechanism including a plug having a stem and a flange, an annular seal positioned around said stem adjacent said flange, and a biasing mechanism that biases said annular seal toward said end wall.

2. The hydraulic pressure multiplier of claim 1, wherein said bore through said inner piston is in fluid communication with a slave cylinder.

3. The hydraulic pressure multiplier of claim 1, wherein said biasing mechanism is a compression spring positioned substantially concentrically around said inner piston.

4. The hydraulic pressure multiplier of claim 1, wherein said outer piston is movable between an unactuated position in which said mechanism is in an open position and an actuated position in which said mechanism is in a closed position.

5. The hydraulic pressure multiplier of claim 1, wherein said outer piston is smaller than said cavity so that a gap is formed between said outer piston and an inner surface of said cavity.

6. The hydraulic pressure multiplier of claim 5, further comprising a gasket positioned in said gap and around said outer piston.

7. The hydraulic pressure multiplier of claim 1, further comprising a gasket positioned around said inner piston and within said inner recess.

8. The hydraulic pressure multiplier of claim 1, further comprising a gasket positioned around said outer piston and within said cavity.

9. The hydraulic pressure multiplier of claim 8, further comprising a fluid chamber defined by said cavity, said sidewall and said end wall of said outer piston, and said gasket, wherein said fluid chamber is in fluid communication with an inlet port.

10. A hydraulic pressure multiplier comprising a housing defining a cavity, an inlet port in said housing that is in fluid communication with said cavity, an outer piston movably positioned within said cavity and including a sidewall and an end wall that together define an inner recess having an open end, said outer piston being smaller than said cavity so that a gap is formed between said outer piston and an inner surface of said cavity, a gasket positioned in said gap and around said outer piston, a stationary inner piston received in said open end of said inner recess in said outer piston, a bore through said inner piston, an opening through said sidewall of said outer piston providing fluid communication between said cavity and said inner recess, said opening and said gasket being positioned so that said opening is positioned between said gasket and said inlet port in an axial direction when said outer piston is in the unactuated position and said gasket is positioned between said opening and said inlet port in an axial direction when said outer piston is in the actuated position, a biasing mechanism applying a biasing force to said outer piston, and a mechanism to close the fluid communication between said cavity and said inner recess when said biasing force is overcome by pressure within said cavity.

11. The hydraulic pressure multiplier of claim 10, wherein said opening through said outer piston is located in said end wall.

12. The hydraulic pressure multiplier of claim 11, wherein said mechanism includes a plug having a stem and a flange, an annular seal positioned around said stem adjacent said flange, and a biasing mechanism that biases said annular seal toward said end wall.

13. The hydraulic pressure multiplier of claim 12, wherein said stem extends through said opening and engages said housing when said outer piston is in an unactuated position, and said annular seal is spaced from said end wall.

14. The hydraulic pressure multiplier of claim 13, wherein said stem has an outer diameter that is less than the diameter of said opening.

15. The hydraulic pressure multiplier of claim 11, wherein said housing includes a plug extending therefrom and into said opening, said plug having an outer diameter that is less than the diameter of said opening.

16. The hydraulic pressure multiplier of claim 15, wherein said mechanism includes a ball positioned adjacent to said opening and a biasing mechanism that biases said ball toward said opening.

17. The hydraulic pressure multiplier of claim 15, wherein said plug extends through said opening when said outer piston is in an unactuated position to prevent said ball from closing said opening.

* * * * *